United States Patent
Dunning et al.

(10) Patent No.: US 6,765,975 B2
(45) Date of Patent: Jul. 20, 2004

(54) METHOD AND APPARATUS FOR A TRACKING DATA RECEIVER COMPENSATING FOR DETERMINISTIC JITTER

(75) Inventors: David S. Dunning, Portland, OR (US); Chamath Abhayagunawardhana, Portland, OR (US); Ken Drottar, Portland, OR (US); Richard S. Jensen, Aoha, OR (US)

(73) Assignee: Intel Corporation, Santa Clara, CA (US)

( * ) Notice: Subject to any disclaimer, the term of this patent is extended or adjusted under 35 U.S.C. 154(b) by 609 days.

(21) Appl. No.: 09/741,319

(22) Filed: Dec. 19, 2000

(65) Prior Publication Data

US 2004/0071247 A1 Apr. 15, 2004

(51) Int. Cl.[7] .................. H04L 25/36; H04L 25/40; H04L 7/00
(52) U.S. Cl. .................. 375/371; 375/373; 375/355; 370/517; 327/161
(58) Field of Search .................. 375/355, 371, 375/372, 373, 374, 375, 376; 327/144, 146, 147, 150, 152, 153, 155, 156, 159, 161–163; 370/516, 517, 518, 519

(56) References Cited

U.S. PATENT DOCUMENTS

| | | | | |
|---|---|---|---|---|
| 5,022,056 A | * | 6/1991 | Henderson et al. | 375/373 |
| 5,488,639 A | * | 1/1996 | MacWilliams et al. | 375/355 |
| 5,687,203 A | * | 11/1997 | Baba | 375/376 |
| 5,761,254 A | * | 6/1998 | Behrin | 375/355 |
| 5,818,890 A | * | 10/1998 | Ford et al. | 375/371 |
| 5,822,386 A | * | 10/1998 | Pawelski | 375/373 |
| 5,887,040 A | * | 3/1999 | Jung et al. | 375/372 |
| 6,236,696 B1 | * | 5/2001 | Aoki et al. | 375/376 |
| 6,373,911 B1 | * | 4/2002 | Tajima et al. | 375/375 |

* cited by examiner

Primary Examiner—Phoung Phu
(74) Attorney, Agent, or Firm—Kenyon & Kenyon

(57) ABSTRACT

A tracking data receiver which can compensate for deterministic jitter is disclosed. The device utilizes a history of past data received to determine which of multiple samples taken within a bit period to utilize. Due to deterministic jitter that can occur in data signal communication, the delay of waveform development varies with the ratio of 0's to 1's transmitted prior to the bit period being observed. The present invention exploits the predictable nature of the deterministic jitter to decide which sample to choose.

28 Claims, 3 Drawing Sheets

METHOD AND APPARATUS FOR A TRACKING DATA RECEIVER COMPENSATING FOR DETERMINISTIC JITTER

BACKGROUND INFORMATION

Two basic receiver architectures are prevalent in the industry today; tracking and over-sampling. In summary, tracking receivers use a PLL (phase locked loop) structure or functionally equivalent structure such as an application of a DLL (delay locked loop) that compares the phase of received data with a local clock's phase and adjusts the local clock's phase to match the received data's phase. In addition, the structure modulates the frequency of the local clock to match the rate of the incoming data. (See G. C. Hsieh, J. C. Hung, *Phase-Locked Loop Techniques—A Survey*, IEEE Trans. on Industrial Electronics, Vol. IE-43, No.6, 609–615, December 1996.) It tracks and synchronizes itself to the received data so that it can sample the data with appropriate timing to reliably receive it. Tracking the rate of received data enables the structure to sample the data with consistent timing for each bit received. By tracking the rate and phase of the data, the receiver can tolerate phase and amplitude jitter that may be present in the received waveform due to various noise sources.

An over-sampling receiver avoids the use of a PLL structure by taking many samples of the received data and looking at the history of those samples to filter out noise in the data. The structure analyzes the history of past samples and utilizes one of various algorithms to determine which samples are providing a correct representation of received data and which are erroneous and/or redundant.

Tracking receivers typically perform only a single sample per bit to recover the data. There is the potential for error occurring due to the fact that the sample is taken at the same point in the bit period each time. Deterministic jitter, as explained below, can cause the waveform of the received data to change and shift within the bit period. This can cause a PLL structure to potentially sample the data too early or too late within the bit period because the bit may not have fully formed or because the transition to the next bit has already begun at that sample time. This would cause the sampler to provide an erroneous result.

In general, over-sampling receivers contain a much higher percentage of digital circuitry, which should be more tolerant of noise sources. However, the rate at which they sample the incoming waveform has to be increased with increasing jitter in the channel. Also, the over-sampling receiver needs to handle the frequency difference between the transmit and receive clocks.

There are primarily two types of noise (jitter) that the receivers must deal with: random and deterministic. Random jitter is produced by various sources. The effect each individual noise source has is not predictable, and the accumulation of the unpredictable noises is the random jitter. The accumulation has a symmetrical distribution centered around where the expected signal should be located. Because the average (accumulation over time) of these sources is the correct point in time, it is not difficult to compensate for.

Deterministic jitter is a main concern of the present invention. This type of noise is caused primarily by the interaction of capacitive, inductive, and resistive effects of the media upon which the data travels. Deterministic jitter does not have a symmetrical effect on the signal. It can cause the waveform to distort and shift in time (determined by the pattern of signal sent down the media channel). This creates the possibility of receivers utilizing over-sampling and tracking methods to acquire erroneous interpretations of the received data. When utilizing tracking methods, the sampling of the signal may be taken too early or too late. The distortion and shifting of the waveform could cause the sampler to read the data before or after it has reached the correct level or started its transition to the next level. Similarly, over-sampling methods could misinterpret received data because of the shift in time that the deterministic jitter causes on the waveform of the data. The effects of deterministic jitter on the received data can be predicted algorithmically with usage of the history of previously received data.

Because of the foregoing problems with sampling receivers in the art, there is a need for a sampling data receiver that is not susceptible to the various problems that occur in tracking and over-sampling receivers.

DETAILED DESCRIPTION

A system and method are disclosed for a sampling data receiver based on digital tracking. The present invention avoids the design problems mentioned previously by using a multi-edge sampling clock and a digital tracking mechanism to recover the data. The traditional tracking receivers base the data decisions on a single sample taken during a bit period. The sampling has to be timed such that it happens within the time during which the waveform is on the correct side of the bit threshold within the bit period. This time period is referred to herein as the receiver 'eye opening'. When the jitter seen at the receiver is large, some of the eye openings reduce, making it difficult to trigger the samples within those reduced eye openings. In extreme cases, the sampler may miss excessively jittered pulses (known as lone pulses or lone edges). The proposed receiver avoids this problem by using a multi-edge clock signal to trigger multiple samplers within the eye opening. This effectively stretches the aperture of the receiver sampler. The multiple samplers produce more than one sample per bit period, most of which will fall inside the eye opening. The receiver consults the past history of the received data in order to predict the effect of deterministic jitter on the data being currently received. The device utilizes this information to decide which of several samplers, which sample at different points in the bit period, to utilize. By choosing an appropriate sampler, there is less likelihood of getting erroneous results by sampling at the wrong time.

Because of the interaction of capacitive, inductive, and resistive effects, the amount of deterministic jitter is related to the amount of time the signal spends at 0 before transitioning to 1 or at 1 before transitioning to 0. The more time the signal spends at 0 or 1 as compared to 1 or 0, respectively, prior to the bit period being viewed, the greater the amount of deterministic jitter.

Figure 1:
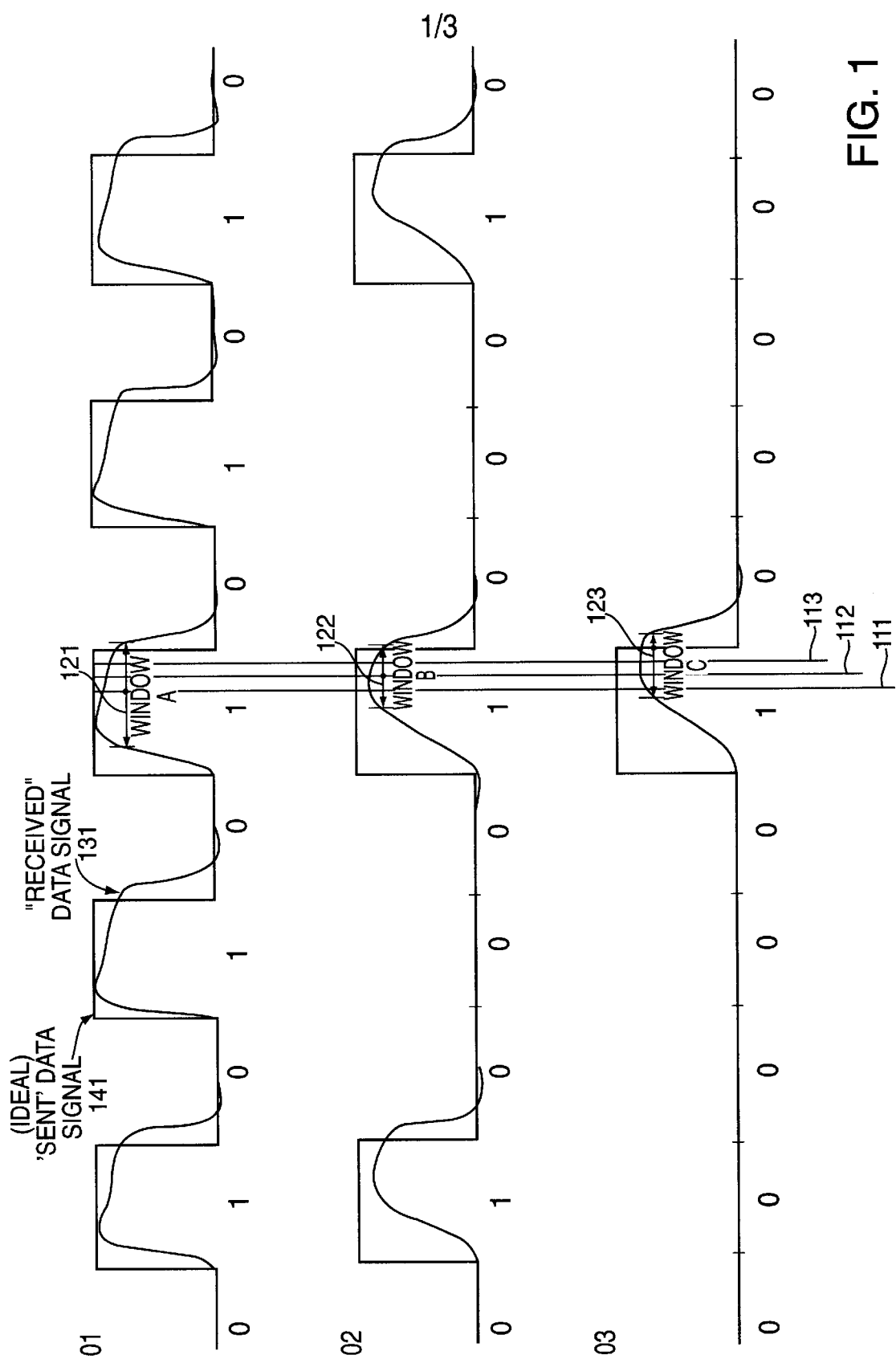
FIG. 1 illustrates three data stream waveforms, each of a different combination of serial binary values to illustrate the deterministic jitter caused by varying the combination.

FIG. 1 illustrates three data stream waveforms, each of a different combination of serial binary values to illustrate the change in deterministic jitter caused by varying the ratio of 0's to 1's. The first waveform 101 represents a signal with an equal number of 1's and 0's preceding the bit period being viewed. The effect of deterministic jitter caused by the media of transmission is normalized to be zero (ideal) in this signal. The window (eye opening) for resolvable binary data, window A 121, of the 'received' data signal 131 is shifted in time somewhat and is reduced in width somewhat from the (ideal) 'sent' data signal 141. With this data signal waveform 101, there is an optimum point 111 in the bit period (dead center in the bit period) to sample the signal.

The second waveform 102 represents a signal with more 0's than 1's preceding the bit period being viewed. The deterministic jitter is greater here, i.e. the wave is delayed more in time and the wave is reduced in height because of the interaction of capacitive, inductive, and resistive effects. Hence, the eye opening, window B 122, is delayed in time from and smaller in width than that of the first waveform 101. The optimum point 112 in the waveform for sampling is later in time than that for the first waveform 101.

The third waveform 103 represents a signal with substantially more 0's than 1's preceding the bit period being viewed. The deterministic jitter occurring here is greater than for either the first waveform 101 or the second waveform 102. The optimum point 113 for sampling this signal, therefore, is later than either the first waveform 101 or the second waveform 102.

Figure 2:
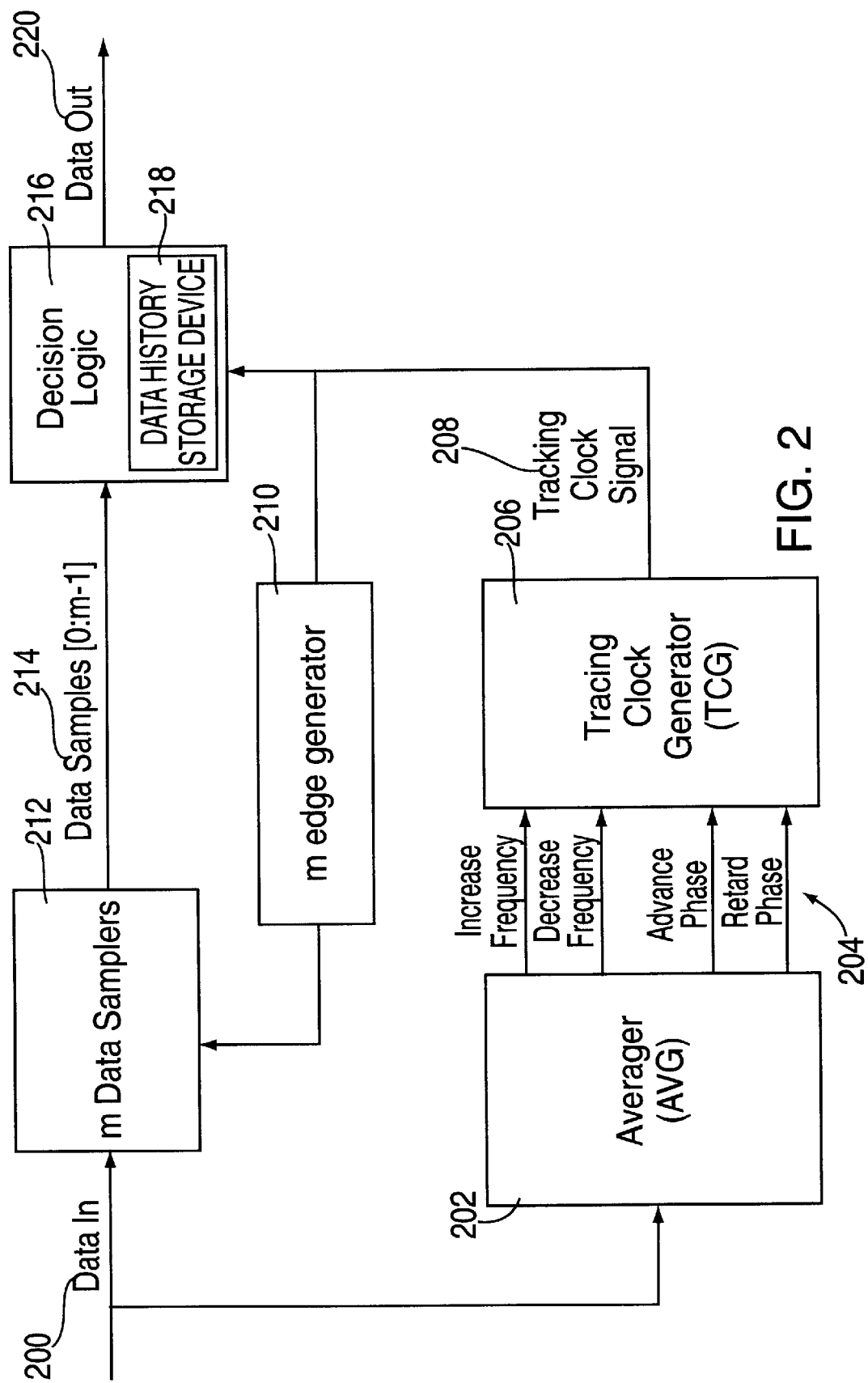
FIG. 2 provides a block diagram of an embodiment of the present invention.

FIG. 2 provides a block diagram of a system constructed according to the present invention. An embodiment of the present invention receives a data signal at the 'data in' 200 side of the circuit from a data source. An averager 202 receives the data signal from 'data in' 200. The averager 202 observes the signal, and by analyzing the spacing between binary transitions over a period of time, is able to determine the frequency and phase of the received signal from 'data in' 200. The averager 202 then sends control information to a tracking clock generator 206. The tracking clock generator 206 utilizes the control information 204 to adjust an internal oscillator, called the tracking clock signal 208, to match the frequency and phase of the received signal for 'data in' 200. The averager 202, when necessary, tells the tracking clock generator 206 to increase or decrease the tracking clock signal 208 frequency, and, when necessary, it tells the tracking clock generator 206 to advance or retard the phase of the tracking clock signal 208.

A device called the 'm edge generator' 210 receives the tracking clock signal 208. In this embodiment, the m edge generator produces multiple edge triggers that are a pre-defined distance apart in time from each other and begin after a predefined delay in time form the tracking clock signal 208. This initial predefined delay from the tracking clock signal 208 is referred to herein as the 'tunable offset Td' 300 (see FIG. 3). The multiple edge triggers are received by multiple data samplers, called 'm data samplers' 212. The multiple edge triggers activate each of the m data samplers 212 at a different time within the bit period (determined by the timing of the specific edge trigger). Each of the m data samplers reads the received signal from data in 200 at the appropriate time. These data samples [0:m–1] 214 are received by decision logic 216, which contains a data history storage device 218. The decision logic decides which data sample to forward on to 'data out' 220 by reviewing past data history of the samples, stored in the data history storage device 218. Each time the decision logic 216 is triggered by the edge of the tracking clock signal 208, the decision logic 216 reviews the past history of received data and algorithmically chooses the data sample that would statistically be located in the optimum point in the bit period.

Figure 3:
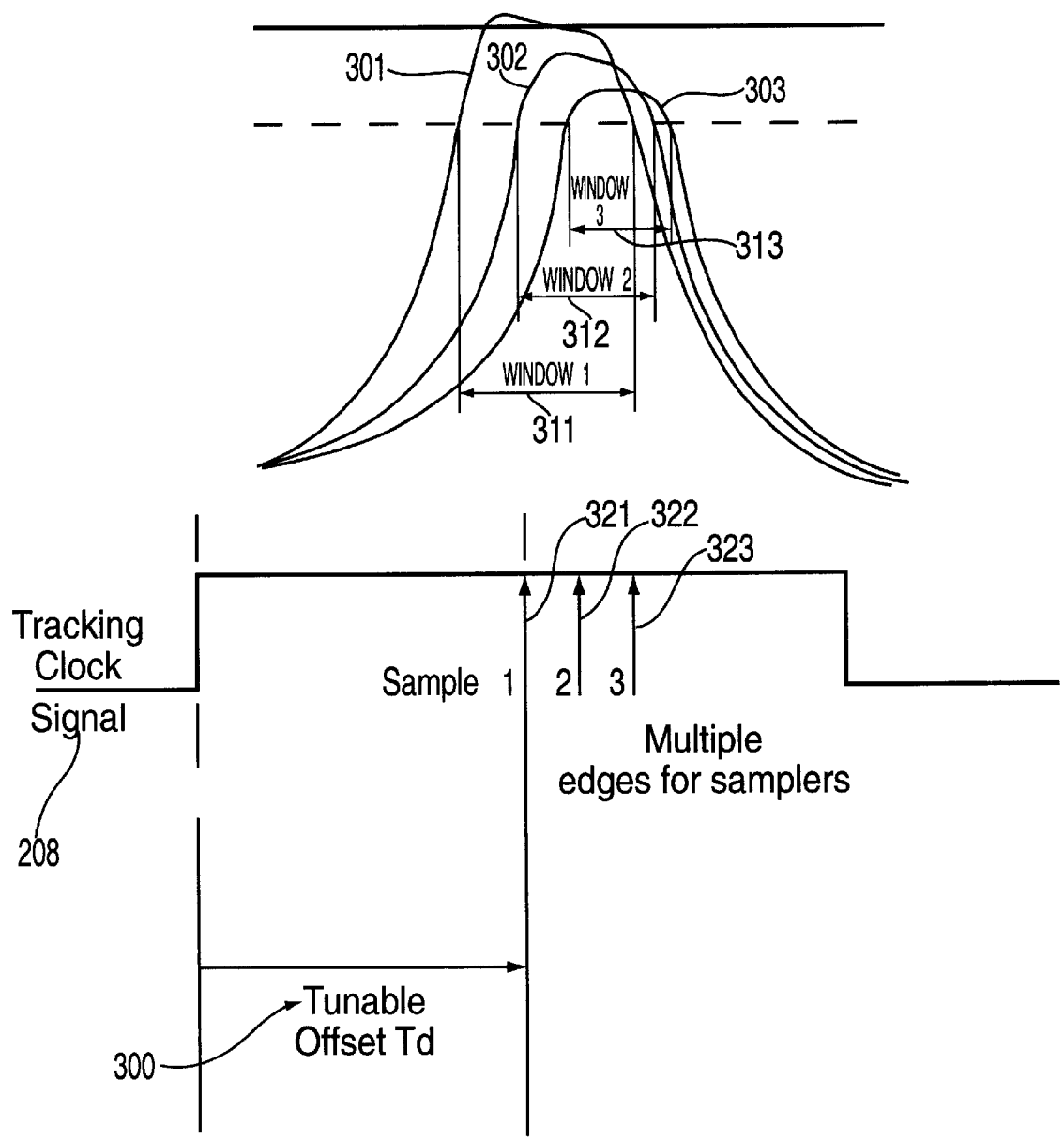
FIG. 3 illustrates three different waveforms corresponding to three different amounts of shift and distortion by deterministic jitter, and it shows the three optimum points in the bit period to sample the three different received signals.

FIG. 3 illustrates three different waveforms corresponding to three different amounts of shift and distortion by deterministic jitter, and it shows the three optimum points in the bit period to sample the three different received signals. As explained for FIG. 2, the tracking clock signal 208 provides a starting point of the bit period for the system. The tunable offset Td 300 is predefined prior to operation based on the media and configuration utilized. It is established for the timing of the earliest waveform possible 301 (with the least capacitive, inductive and resistive effects). This waveform has the largest window, 'window 1' 311. The optimum sample for this waveform would be triggered at 'sample 1' 321. In this embodiment three samples (m=3) are utilized. The second sample, triggered at 'sample 2' 322 would be optimum for a waveform with a moderate amount of delay 302. This waveform has a somewhat smaller window, 'window 2' 312, and greater delay than the first waveform 301. The third sample, triggered at 'sample 3', is utilized for the latest possible waveform for the given media and configuration. This waveform 303 is the latest and has the smallest window, 'window 3' 313, of the three waveforms.

Although several embodiments are specifically illustrated and described herein, it will be appreciated that modifications and variations of the present invention are covered by the above teachings and within the purview of the appended claims without departing from the spirit and intended scope of the invention.

What is claimed:

1. A system for sampling data, comprising:
   a plurality of data samplers, where each data sampler is to acquire a current data sample from a data source, and each data sampler is to operate at a discrete, pre-defined delay from a plurality of discrete, pre-defined delays from a tracking clock signal;
   a data history storage device to store a plurality of past data samples;
   an averager to analyze the data source to determine a phase and frequency of the data source; and
   decision logic to analyze the plurality of past data samples to determine which current data sample of the plurality of data samples to utilize.

2. The system of claim 1, further comprising:
   a tracking clock generator; and
   an edge generator.

3. The system of claim 1, wherein the averager utilizes an average time spacing between bit transitions of the data source to determine the phase and frequency of the data source.

4. The system of claim 2, wherein the tracking clock generator develops the tracking clock signal.

5. The system of claim 4, wherein the tracking clock generator develops the tracking clock signal based on a phase and frequency of the data source.

6. The system of claim 4, wherein the edge generator provides a plurality of edge triggers.

7. The system of claim 4, wherein the edge generator provides each edge trigger from the plurality of edge triggers at a discrete, pre-defined delay from the plurality of discrete, pre-defined delays from the tracking clock signal.

8. The system of claim 7, wherein each edge trigger of the plurality of edge triggers corresponds to a data sampler of the plurality of data samplers.

9. The system of claim 8, wherein each edge trigger of the plurality of edge triggers activates the corresponding data sampler of the plurality of data samplers.

10. The system of claim 1, wherein the history storage device is included within the decision logic.

11. The system of claim 1, wherein the history storage device utilizes First In, First Out circuitry.

12. A method for sampling data, comprising:
   acquiring from a data source by each data sampler of a plurality of data samplers a current data sample from a plurality of current data samples;
   operating by each data sampler of a plurality of data samplers at a discrete, pre-defined delay from a plurality of discrete, pre-defined delays from a tracking clock signal;
   storing by a data history storage device the plurality of past data samples;
   analyzing the data source with an averager to determine a phase and frequency of the data source; and
   analyzing by decision logic a plurality of past data samples to determine which current data sample of a plurality of data samples to utilize.

13. The method of claim 12, wherein the averager utilizes an average time spacing between bit transitions of the data source to determine the phase and frequency of the data source.

14. The method of claim 12, wherein a tracking clock generator develops a tracking clock signal.

15. The method of claim 14, wherein the tracking clock generator develops the tracking clock signal based on a phase and frequency of the data source.

16. The method of claim 14, wherein an edge generator provides a plurality of edge triggers.

17. The method of claim 14, wherein the edge generator provides each edge trigger from the plurality of edge triggers at a discrete, pre-defined delay from the plurality of discrete, pre-defined delays from the tracking clock signal.

18. The method of claim 17, wherein each edge trigger of the plurality of edge triggers corresponds to a data sampler of the plurality of data samplers.

19. The method of claim 18, wherein each edge trigger of the plurality of edge triggers activates the corresponding data sampler of the plurality of data samplers.

20. The system of claim 12, wherein the history storage device is included within the decision logic.

21. A system for sampling data, comprising:
   a plurality of data samplers, where each data sampler is to acquire a current data sample from a data source, and each data sampler is to operate at a discrete, pre-defined delay from a plurality of discrete, pre-defined delays from a tracking clock signal;
   a data history storage device to store a plurality of past data samples;
   decision logic to analyze the plurality of past data samples to determine which current data sample of the plurality of data samples to utilize;
   an averager to analyze the data source for determining a phase and frequency of the data source;
   a tracking clock generator to develop a tracking clock signal;
   an edge generator to provide a plurality of edge triggers.

22. The system of claim 21, wherein the averager utilizes an average time spacing between bit transitions of the data source to determine the phase and frequency of the data source.

23. The system of claim 21, wherein the tracking clock generator develops the tracking clock signal based on a phase and frequency of the data source.

24. The system of claim 21, wherein the edge generator provides each edge trigger from the plurality of edge triggers at a discrete, pre-defined delay from the plurality of discrete, pre-defined delays from the tracking clock signal.

25. The system of claim 24, wherein each edge trigger of the plurality of edge triggers corresponds to a data sampler of the plurality of data samplers.

26. The system of claim 25, wherein each edge trigger of the plurality of edge triggers activates the corresponding data sampler of the plurality of data samplers.

27. The system of claim 21, wherein the history storage device is included within the decision logic.

28. The system of claim 21, wherein the history storage device utilizes First In, First Out circuitry.

* * * * *